United States Patent [19]

Oshikoshi et al.

[11] Patent Number: 5,042,078
[45] Date of Patent: Aug. 20, 1991

[54] METHOD OF EFFECTING GRADATION AND COLOR CORRECTION OF A COMPOSITE IMAGE

[75] Inventors: Yuji Oshikoshi, Tokyo; Eiichi Kito, Kanagawa, both of Japan

[73] Assignee: Fuji Photo Film Co., Ltd., Kanagawa, Japan

[21] Appl. No.: 208,616

[22] Filed: Aug. 20, 1988

[30] Foreign Application Priority Data

Jun. 19, 1987 [JP] Japan .................................. 62-152981
Jun. 19, 1987 [JP] Japan .................................. 62-152983
Jul. 10, 1987 [JP] Japan .................................. 62-172490

[51] Int. Cl.$^5$ .......................................... G06K 9/40
[52] U.S. Cl. .......................................... 382/54; 355/40; 358/183; 358/80
[58] Field of Search ................. 382/54, 41, 1; 358/22, 358/28, 29, 183, 314, 160, 80; 355/20, 40, 77

[56] References Cited

U.S. PATENT DOCUMENTS

| | | | |
|---|---|---|---|
| 4,514,767 | 4/1985 | Kubota et al. | 382/54 |
| 4,641,244 | 2/1987 | Wilson et al. | 382/54 |
| 4,691,365 | 9/1987 | Nayashima | 382/382 |
| 4,712,909 | 12/1987 | Oshikoshi | 335/20 |
| 4,853,970 | 8/1989 | Ott et al. | 382/54 |
| 4,860,373 | 8/1989 | Hartlon et al. | 382/54 |
| 4,935,879 | 6/1990 | Ueda | 382/54 |
| 4,941,192 | 7/1990 | Mishima et al. | 382/54 |

*Primary Examiner*—David K. Moore
*Assistant Examiner*—Joseph Mancoso
*Attorney, Agent, or Firm*—Sughrue, Mion, Zinn Macpeak & Seas

[57] ABSTRACT

A method of making color and gradation correction performs color and gradation correction differently for a human subject image and a computer graphic image before or after composing these images. A gradation correction is carried out by the use of linear table data written in a look-up table for computer graphic images and non-linear table data for human subject images. A color correction circuit for transforming image data by the use of a matrix calculation comprises three look-up table memories and an adder for adding together outputs from the look-up table memories for each color to be color corrected. In these three look-up table memories, different table data are written in, according to the kinds of human subject image and computer graphic image. There are provided a plurality of different table data for human subject images and computer graphic images, respectively and suitable table data are selected according to a human subject image and a computer graphic image to be composed.

14 Claims, 4 Drawing Sheets

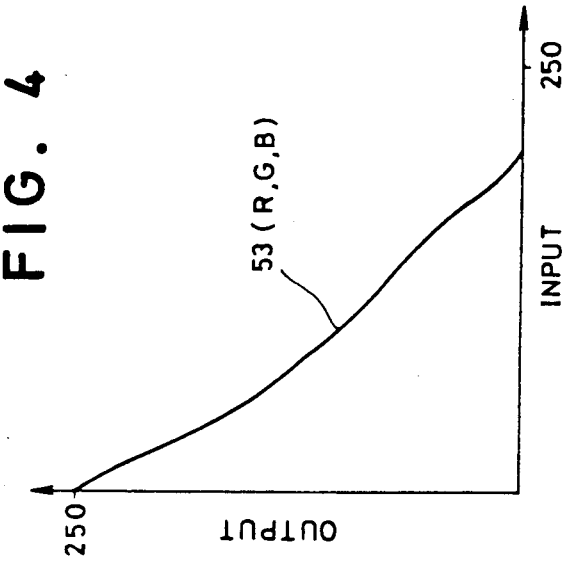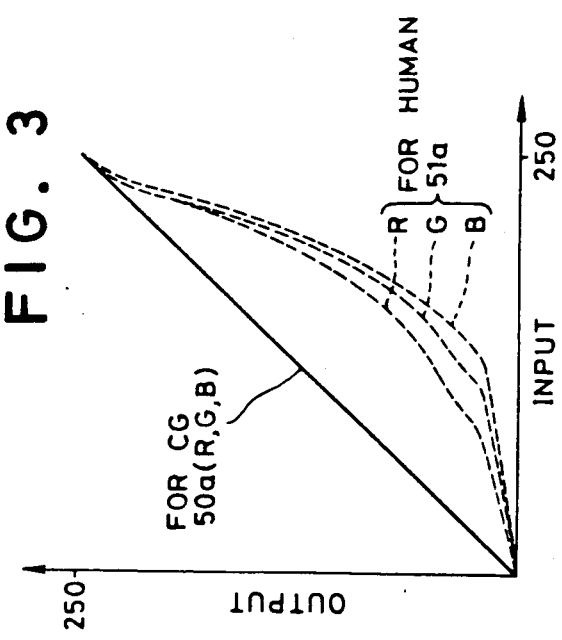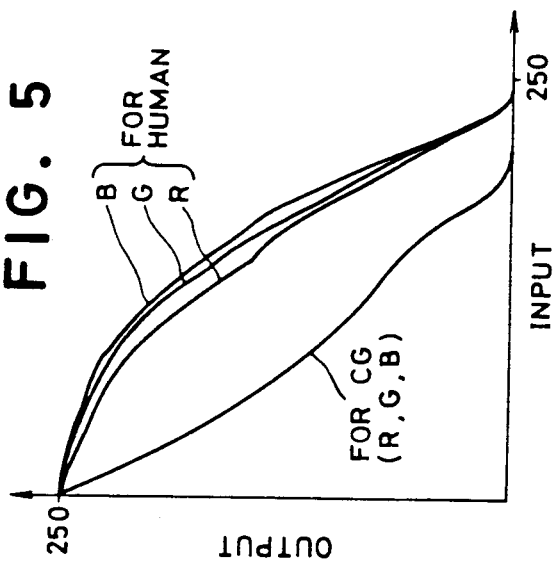

METHOD OF EFFECTING GRADATION AND COLOR CORRECTION OF A COMPOSITE IMAGE

BACKGROUND OF THE INVENTION

The present invention relates to a method of correcting gradation and color balance of a composite image.

In recent years, there has been increased use of various personal cards such as corporation ID cards with individual FIGURES or human photographs. One such card having an individual human photograph comprises a data indication sheet inside of a plastic frame sheet that is backed with a plastic core sheet and sandwiched between transparent plastic cover sheets.

As is disclosed in U.S. Pat. No. 4,712,909, entitled "CRT COMPOSITE IMAGE PRINTING METHOD AND APPARATUS". issued Dec. 15, 1987, a data indication sheet comprises a sheet of color photographic paper having an individual human color image thereon, a computer graphic color image such as a pattern or a company identification mark, and printed characters of personal data and so forth. These images and characters are composed electrically as video signals and displayed on a CRT as a visible composite image to which the color photographic paper is exposed. A human subject image can be provided either by directly taking an image of a human subject using a TV camera or by taking an image of a human subject image formed on a negative film or print and inputting it into a video printer in the form of video signals. On the other hand, computer graphic images (which are hereinafter referred to as CG images) are usually provided by using a digitizer and are recorded in the form of image signals in a diskette or the like.

For better composite images, images to be composed are subjected to gradation and/or color corrections before being composed. A gradation correction circuit is used to effect these corrections and includes look-up table memories carrying table data, one memory for each color, namely red, green and blue, in order to transform respective color image signals. As a color correction circuit, there are provided three look-up table memories and one adder for adding together outputs from each of the look-up tables for each of the three colors.

Conventionally, the same table data is applied to both of the human subject image and CG image of a composite image in order to make a correction. Because there is a difference in image characteristics between the CG image made artificially and the human subject image which is taken from a real human subject, if the same table data is applied to both of these images, it is hard to provide a print of the composite image of these images having both well corrected color balance and gradation.

Further, in the case of images of human subjects taken under different lighting conditions with the same TV camera, finished prints show different color balances and gradations. The same table data is applied to the human subject and CG images in order to improve mainly the color balance and gradation of the human subject image of the composite image according to the lighting conditions under which the human subject image is taken, the color balance of the CG image processed along with the human subject image will change.

OBJECT OF THE INVENTION

It is, therefore, an object of the present invention to provide a method of correcting gradation which can provide a composite image of a human subject image and a CG image with well corrected gradation.

It is another object of the present invention to provide a method of correcting color balance which can provide a composite image of a human subject image and a CG image with well corrected color balance.

SUMMARY OF THE INVENTION

For accomplishing the above objects, the present invention provides a method of correcting the gradation and color balance of a composite image in which different gradation correction data and different color balance correction data are provided for human subject images and CG images, respectively. There have previously been provided different correction table data not only for human subject images but also for CG images. Since different gradation correction data can be independently applied to a human subject image and a CG image, each image is corrected with the most suitable gradation. Therefore, a composite image of the human subject image and the CG image with a well corrected gradation is formed on a print.

Color correction is effected to provide a vivid color print. CG images, although displayed clearly on a color monitor, are generally faded when printed on color photographic paper. Therefore, it is desirable for CG images to be color corrected using a color correction matrix formula so as to increase development of the chroma of a CG image in order to finish a print with a color similar to that of the CG image displayed on the color monitor. However, in the case of CG images with fine changes of gradation, color correction is ineffective for a CG image with color having a high chroma because of saturation of the resulting outputs of the color correction matrix calculation. On the other hand, a CG image with color having a half tone is overly corrected in color, resulting in an unusual color. Therefore, it is desirable not to conduct color correction for such CG images.

Because a human subject image usually has the face of a human subject as a principle image, the human face will be corrected to have a desirable tint as a result of performing color correction of the human subject image. However, tint of facial images depends on users or picture evaluators.

According to the present invention, desired color correction data is selected from among various data provided for various kinds of images and set in a color correction circuit. Because of the setting of the desired data in a color and/or gradation correction circuit, the optimum color and/or gradation correction can be realized for various kinds and patterns of images. In addition, since it is enough to provide a single signal processing system for selectively performing different corrections, printers embodying the method of the present invention can be made at a low manufacturing cost.

BRIEF DESCRIPTION OF THE DRAWINGS

The above and other objects, features and advantages of the present invention will become apparent from the following description of the preferred embodiment thereof with reference to the accompanying drawings in which:

FIG. 3 is a graph showing an example of gradation correction data applied to CG images and human subject images;

FIG. 4 is a graph of an example of gradation correction data depending on a photographic processing system;

FIG. 5 is a graph of composite data of the gradation data of FIGS. 3 and 4;

DETAILED DESCRIPTION OF THE INVENTION

Figure 1:
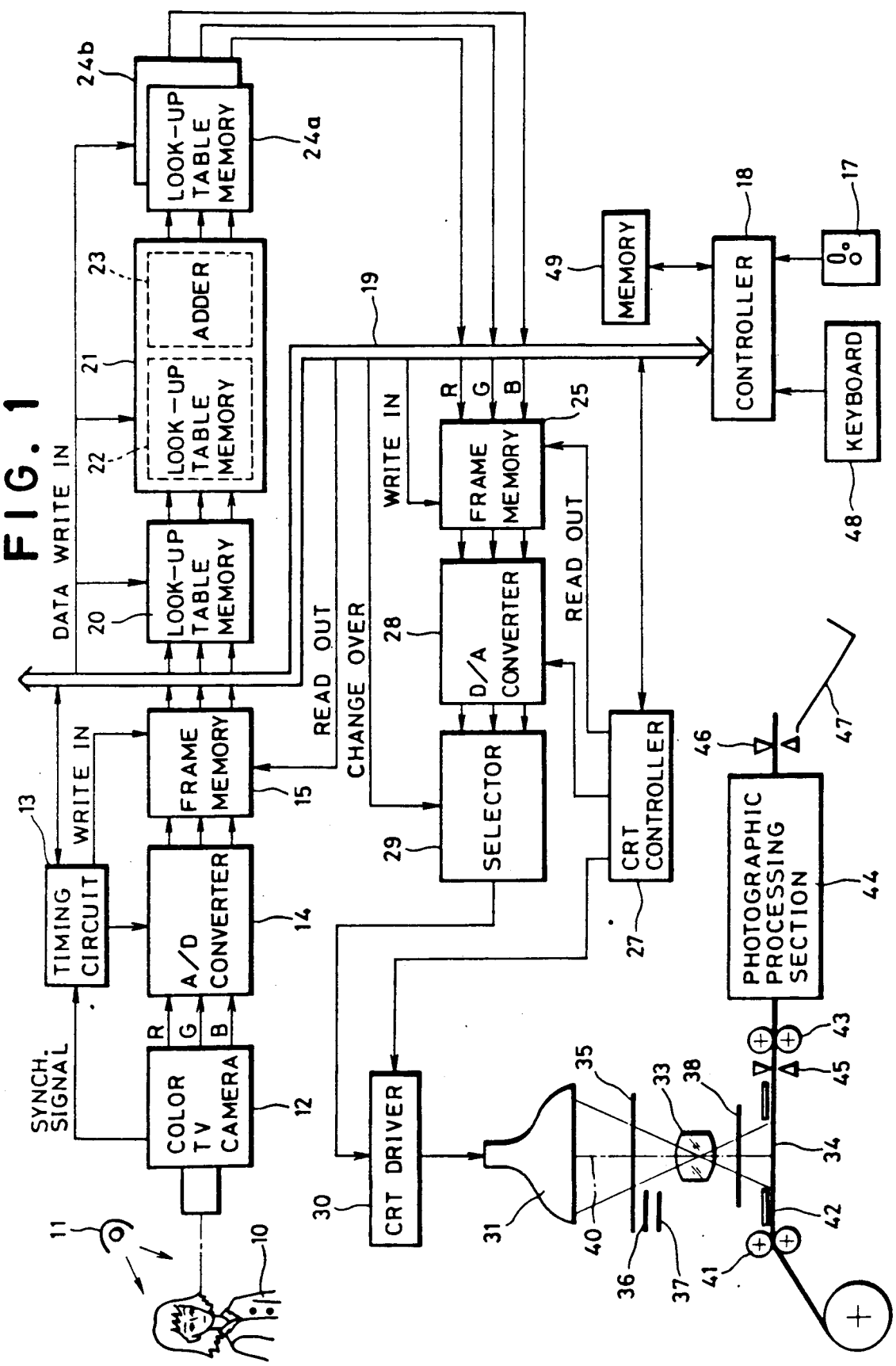
FIG. 1 is a schematic block diagram showing a color video printer embodying the method according to the present invention.

Referring now to FIG. 1, there is shown a specific embodiment of the present invention which is applied to a color video printer for, for example, making identification cards. An image of a human subject 10 who is illuminated by a lamp 11 in a studio is directly taken by a color TV camera 12. Otherwise, an image of a human subject formed on a color film or a color print may be taken by the color TV camera 12. It is to be noted that a monochromatic TV camera associated with a filter turret having red, green and blue color filters may be applicable.

The color TV camera 12 supplies image information of the human subject 10 in the form of video signals for three colors and synchronizing signals. A timing circuit 13 outputs timing signals for an A/D converter 14 and address signals for a frame memory 15 based on the synchronizing signals. The A/D converter 14 converts the color video signals for red, green and blue to digital form and sends the converted signals to the frame memory 15 where those color video signals are written in specified address areas.

In a diskette 17, image information of various computer graphic color images provided by a digitizer or the like are recorded. Necessary CG image information can be read out by a diskette drive (not shown) and input to a controller 18.

Human subject image signals read out from the frame memory 15 for each color and CG image signals retrieved from the diskette 17 are sent to a look-up table memory 20 through a bus line 19, so as to be subjected to gradation or tone correction by color. In a look-up table memory 20, there is written selected table data among various table data previously provided for performing a gradation correction according to a lighting condition and/or the kind of a subject (persons, prints, negative films, positive films, CG images or the like). For example, in the case of taking directly an image of a human subject, the gradation correction is effected in such a way that three color image signals of a gray scale directly taken by the TV camera 12 become the same specified value. On the other hand, in the case of a color negative film, the gradation correction is effected in such a way that three color image signals of a color negative film on which an image of a gray scale taken by the TV camera 12 become the same specified value. However, since CG images are independent of changes of gradation when they are input in the video printer, linear, substantially linear, or even bent line table data is used for CG images.

A color correction circuit 21 performs a color correction for improving chroma of a human subject image, CG image or character image by using the following color correction matrix formula (1):

$$\begin{bmatrix} R \\ G \\ B \end{bmatrix} = \begin{bmatrix} a1 & a2 & a3 \\ b1 & b2 & b3 \\ c1 & c2 & c3 \end{bmatrix} \begin{bmatrix} R_0 \\ G_0 \\ B_0 \end{bmatrix} \quad (1)$$

wherein

R, G, and B respectively represent image signals for red, green, and blue after color correction;

$R_O$, $G_O$ and $B_O$ respectively represent image signals for red, green, and blue before color correction; and a1, a2 ..., c2 and c3 are coefficients.

The color correction circuit 21 comprises nine look-up table memories 22 for storing image signals multiplied by the coefficients and adders, one for each color, for adding together data from the look-up table memories 22 in order to perform high speed operation.

The image signals of a human subject image and a CG image after color correction are sent to either a positive image look-up table memory 24a or a negative image look-up table memory 24b so as to be subjected to gradation correction by color. These look-up table memories 24a and 24b are provided to make a gradation correction according to the differences due to kinds of photographic papers and the photographic characteristics of developers. Gradation correction data written in these look-up table memories is the same value for the three colors so as to correctively transform the gradation of a color image into gray on an actual print of the color image.

The image signals of the human subject image and CG image having been subjected to the gradation and color corrections are written into specified areas of a frames memory 25, such as a video RAM, through the bus line 19 so as to be composed. The areas allotted to the respective elemental images positionally correspond to locations on the composite image thereof and are designated through a keyboard 48. The frame memory 25 is addressed to write in the image signals by the controller 18 and to read out the image signals by a CRT controller 27 upon printing. The composite image signals are converted into an analog form by a D/A converter 28 which is operated with timing signals provided by the CRT controller 27. A selector 29 is switched by the controller 18 so as to selectively transmit the composite image signals to a CRT driver 30 by color. The CRT driver 30 drives a black-and-white CRT 31 to display on its screen a black-and-white image in the form of a brightness pattern for every monochromatic composite image.

A color photographic paper 34 is exposed to the black-and-white image on the screen of the black-and-white CRT 31 through a printing lens 33 when shutter means 38 is opened. During this exposure, three primary color filters 35-37 are selectively sequentially inserted between the printing lens 33 and the black-and-white CRT 31 so as to create a monochromatic composite image to which said photographic paper 34 is exposed in sequence. In such a way, the photographic paper 34 is exposed to three different monochromatic composite images, namely red, green and blue images.

The color photographic paper 34 is formed in a roll and is withdrawn by a pair of nip rollers 41 to an exposure station defined by the exposure frame 42. There the color photographic paper 34 is exposed sequentially by frame, each frame being exposed successively to the three monochromatic images each of which is an image displayed on the black-and-white CRT 31. The exposed color photographic paper 34 is transported by a pair of nip rollers 43 one frame at a time toward a photographic processing section 44, where, it is temporarily stored therein. After the exposures of a predetermined number of frames, the exposed color photographic paper 34 is cut off by a cutter 45. Thereafter, the exposed color photographic paper 34 is subjected to photographic processing and cut off into individual prints which are discharged into an external tray 47.

The controller 18 comprises a computer and controls operation of various elements under a programmed sequence of operation according to instructions entered through the keyboard 48. The controller 18 can change areas of the frame memory 15 from which image data is read out by an instruction entered through the keyboard 48 and can perform data interpolation and/or data thinning so as to thereby change the size of a human subject image to be inlaid. A memory 49, as is well known in the art, comprises RAM and ROM to store therein an operation program, table data and the like.

Figure 2:
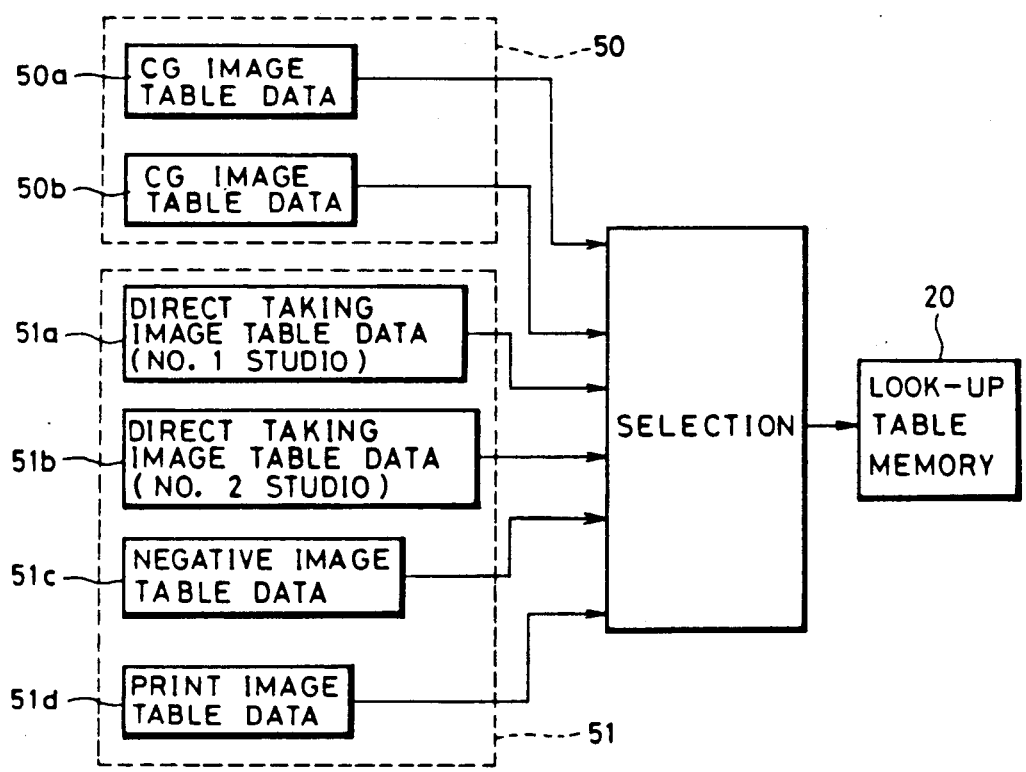
FIG. 2 is a block diagram showing a gradation correction table data entering section of FIG. 1.

Reference is now had to FIG. 2 for the purpose of explaining a manner of writing data in the look-up table memory 20. Because prints are finished differently according to kinds of subjects and/or photographic conditions such as lighting conditions under which images of the subjects are taken, it is desirable for generally better print finishing to execute different gradation corrections according to kinds of subject images. For this reason, there are previously provided different table data 50 for CG images and table data 51 for human subject images in the memory 49. As the human subject table data 51, there are provided a plurality of table data according to subjects, for example table data 51a, 51b, 51c and 51d applied to directly taken human subject images by the color TV camera 12 under different lighting conditions or studio conditions (studio No. 1 and Studio No. 2), a negative color film recording a human subject image and a color print recording a human subject image, respectively. On the other hand, as the table data 50 there are two table data 50a and 50b which are selectively applied to different kinds of CG images. These table data 50 and 51 are selectively written in the look-up table memory 20 with an instruction entered through the keyboard 48.

Figure 7:
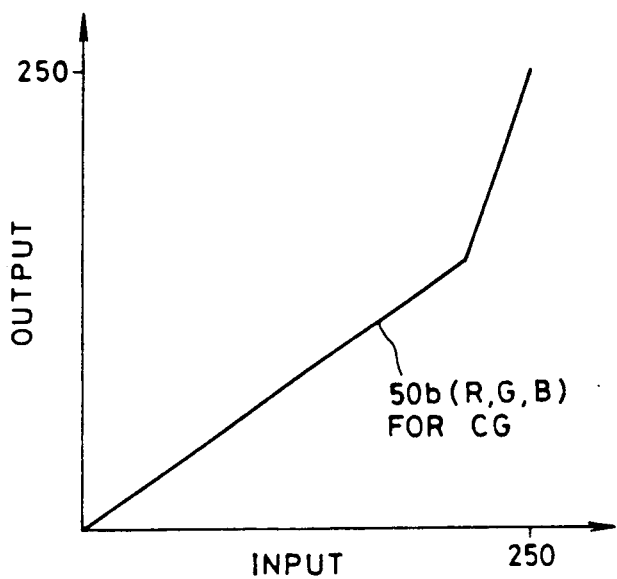
FIG. 7 is a graph of another example of linear gradation correction data applied to CG images.

The table data to be written in the look-up table memory 20 are shown by way of example in FIG. 3. In this example the table data 50a which is a linear data having a gamma value of one (1) is applied commonly to the three pure colors R, G. B of CG images which are unnecessary to be corrected in gradation. The other data 50b shown in FIG. 7 is applied to compound colors of CG images. The look-up table data 51, for example table data 51a for the No. 1 studio, applied to human subject images are non-linear and different from one another.

Referring to FIG. 4, there is shown by the way of example data memorized in the look-up table memory 24a. As was previously described, there are memorized in the look-up table memory 24a table data for making a correction of difference among various kinds of photographic papers and/or among various kinds of developers and table data for performing positive-to-negative reversal. In this example, although the same table data 53 is applied commonly to the three color images, slightly different table data are practically applied. For negative human subject images, there is memorized in the look-up table memory 24b table data for performing a correction of difference depending upon the characteristics of the photographic processing. The look-up table memories 24a and 24b take the form of interchangeable ROMs carrying different table data, one respective to each photographic paper and/or developer. Otherwise, suitable table data may be read out from a diskette carrying various different table data and written in the look-up table memory 24a, 24b.

As a result of combining the above table data memorized in the look-up table memories 22, and 24a or 24b, composite table data shown in FIG. 5 is obtained to perform a gradation correction depending upon the kind of subject image and the kind of photographic processing. If the look-up table memory 24b is selected, the table data of FIG. 5 is reversed.

Figure 6:
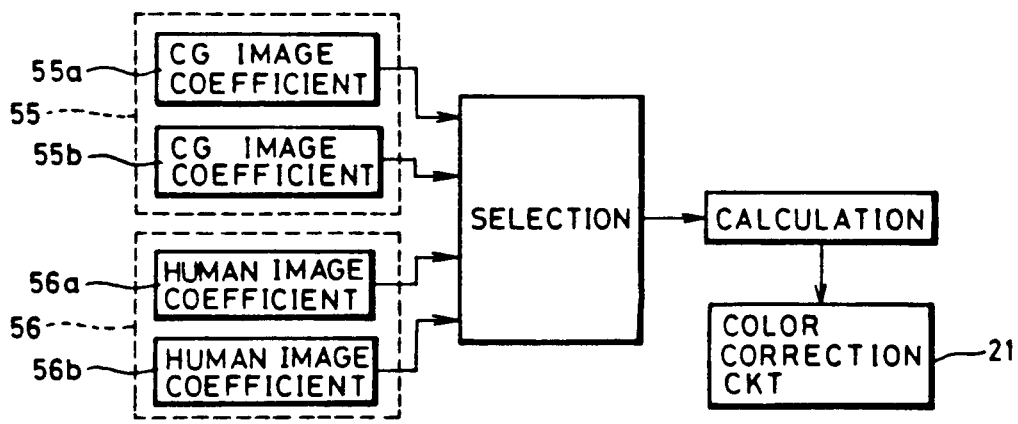
FIG. 6 is a block diagram showing a color correction data entering section of FIG. 1.

FIG. 6 shows a example of writing table data in the look-up table memory 22 of the color correction circuit 21. In the memory 49, there are memorized data 55 of coefficients of the color correction matrix formula for CG images and data 56 of coefficients of the color correction matrix formula for human subject images. According to the kind of image to be subjected to the color correction, a set of coefficients is selected and multiplied by image signals by color to provide look-up table data which, in turn, is written in the look-up table memory 22 of the color correction circuit 21.

For example, there are two sets of coefficients for each image. Specifically, applied to CG images with fine gradation changes is the following coefficient data 55a in the form of a coefficient matrix of the color correction matrix formula (1):

$$\begin{bmatrix} 1 & 0 & 0 \\ 0 & 1 & 0 \\ 0 & 0 & 1 \end{bmatrix} \quad (2)$$

and applied to CG images which are desired to be overly corrected in color in order to result in a color similar to the color of the CG image displayed on the color monitor is the following coefficient data 55b:

$$\begin{bmatrix} 1.37 & -0.34 & -0.03 \\ -0.46 & 1.68 & -0.22 \\ 0.06 & -0.40 & 1.34 \end{bmatrix} \quad (3)$$

When human subject images are directly taken by a color TV camera, the following coefficient data 56a is applied:

$$\begin{bmatrix} 1.3 & -0.2 & -0.1 \\ -0.3 & 1.5 & -0.2 \\ 0.0 & -0.3 & 1.3 \end{bmatrix} \quad (4)$$

To human subject images other than the directly taken human subject images, the following coefficient data 56b is applied:

$$\begin{bmatrix} 1.12 & -0.11 & -0.01 \\ -0.15 & 1.22 & -0.07 \\ -0.02 & -0.13 & 1.11 \end{bmatrix} \qquad (5)$$

A further understanding of the method of correcting color and gradation of a composite image will be had from the following description. In the case of directly taking an image of a human subject in the studio No. 1, an instruction indicating that a human subject image is directly taken in the studio No. 1 is entered through the keyboard 48. According to this instruction, the controller 18 reads out the table data 51a for directly taken image from the memory 49 and writes it into the look-up table memory 20, while retrieving the coefficient data 56a for human subject image from the memory 49 so as to calculate table data for human subject image. This calculated table data is written in the look-up table memory 22 of the color correction circuit 21.

An image of the human subject 10 illuminated by the lamp 11 in the studio No. 1 is taken by the color TV camera 12 and transformed into three color image signals. Each of the color image signals are converted into digital image signals by means of the A/D converter 14 under the control of the timing circuit 13. The digital image signals are addressed by color to be written in the frame memory 15 under the control of the timing circuit 13.

After the image signals are written in the frame memory 15, the controller 18 reads out image signals memorized in the frame memory 15 in the order of the arrangement of picture elements in order to retrieve the image of an upper half of the human subject. The image signals of the upper half of the human subject are sent to the look-up table memory 20 through the bus line 19 by color. As the look-up table memory 20 holds the table data 51a for human subject image shown in FIG. 3, each color of the image signals is corrected in gradation with this table data 51a.

The gradation-corrected image signals are transmitted to the color correction circuit 21 by color, where the image signals are calculated by using the color correction matrix formula (1) in which the coefficient matrix (4) is substituted for color correction.

The image signals after color correction are subjected to a gradation correction by the use of the table data shown in FIG. 4 in the look-up table memory 24a, and then transmitted to and memorized in the frame memory 25 at appropriate addresses through the bus line 19 by color.

When inputting a CG image, the keyboard 48 is operated to cause the controller 18 to read in a desired table data for CG image. When selecting data 50a and 55b through the keyboard 48, the controller 18 writes in the table data 50a for CG image in the look-up table memory 20 and color correction table data calculated based on the coefficient data 55a for CG image in the look-up table memory 22. Thereafter, image signals of the desired CG image are readout from the diskette 17 and input in the controller 18. The CG image signals are transmitted through the bus line 19 and subjected to a gradation correction in the look-up table memory 20 and a color correction by using the color correction matrix formula (1) with the coefficient matrix (2) substituted in the color correction circuit 21. Because the table data 50a has a gamma value of "1" and the terms of the color correction matrix calculation formula excepting the diagonal terms are all "0", the CG image is substantially free from gradation and color corrections.

The CG image signals are subjected to gradation correction according t the photographic processing used in the look-up table memory 24a and then transmitted to and memorized in the frame memory 25 through the bus line 19 by color. Characters such as names, dates and the like are entered through the keyboard 48 and written in the frame memory 25 after being subjected to the same image processing as CG images are subjected to.

The keyboard 48 is operated to enter an instruction for printing. The controller 27 reads out three color image signals of a human subject image from the frame memory 25 and sends them to A/D converter 28 for digital conversion. The selector 29 is controlled by the controller 27 to selectively transmit the three color image signals by color. Each of the color image signals are displayed as a black-and-white image in the form of a brightness pattern on the black-and-white CRT 31 under the control of the black-and-white CRT driver 30. Because the three color image signals are continuously repeatedly read out, the black-and-white CRT 31 continuously displays each color image thereon. When the black-and-white CRT 31 displays the image signals for red, the red filter 35 is inserted into the printing path so as to convert the black-and-white image into a red color image. Simultaneously, the shutter 38 opens to expose the photographic paper 34 to the red color image through the printing lens 33 for a proper time interval so as to form a latent image of the red image therein.

After the exposure of the red image, the selector 29 selectively transmits the image signal for green to the black-and-white CRT 31 to display a black-and-white image in the form of a brightness pattern on the black-and-white CRT 31. The red filter 35 is replaced with the green filter 36 and the shutter 38 is opened again for a proper time interval, so that the photographic paper 34 is exposed to the green color image through the printing lens 33 to form therein a latent image of the green image over the red color latent image. In the same manner as for the red and green images, the photographic paper 34 is formed with a blue color latent image over the red and green latent images.

Figure 8:
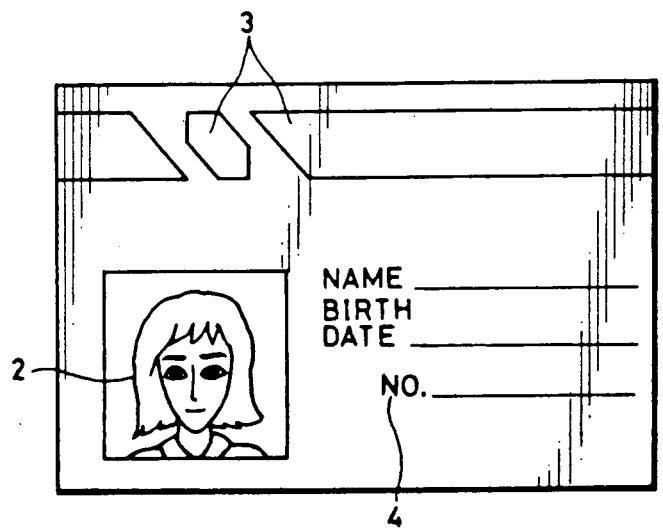
FIG. 8 is a print of a composite image.

After the exposure of a composite image of human subject image, CG image and character image in the manner of three color frame sequential exposure described above, the color photographic paper 34 is transported by one frame. When a predetermined number of frames have been exposed, the cutter 45 cuts off the exposed part of the color photographic paper 34. As is well known, the exposed part of the color photographic paper 34 is processed in the photographic processing section 44 and then cut off to individual prints shown in FIG. 8.

When directly taking an image of a human subject in the No. 2 studio by the color TV camera 12, an instruction indicating a direct image taking in the No. 2 studio is entered through the keyboard 48 to write the table data 51b for the No. 2 studio in the look-up table data 20. Further, if an image of a color negative film is taken by the color TV camera 12, the table data 51c for color negative films is selected and written in the look-up table memory 20. In this case, because no positive-to-negative image conversion is required, the look-up table memory 24b is selected.

Because the CG image has previously been memorized in the frame memory 25, it is enough to input human subject images and character images when a large number of personal cards such as corporation ID cards are to be processed.

In the above embodiment, it is further required to examine a composite image before printing, so a color monitor is provided. The color monitor is connected to the frame memory 25 through an image reversal circuit to display a positive color image thereon. In addition, it is preferable to provide functional keys on the keyboard 48 for color and/or density corrections to input correction data so as to make a proper correction while viewing the color image displayed on the color monitor. The table data for each color is shifted according to the correction data input before being written in the look-up table memory 20.

Although in the above described embodiment, image composing is effected after gradation correction, it is permissible to effect gradation and color corrections after image composing.

It is to be noted that the same CG image can be displayed in different color tints on the same color monitor due to differences between CG image producing devices. This leads to a color difference between an examined image on the color monitor and an image finally printed. For avoiding such an occurrence of color difference, it is desired to provide color correction data one individual to each CG image producing device.

Although the description has been directed to a video printer to which the present invention is applied, it is to be understood that the present invention is applicable also to other printing apparatus.

What is claimed is:

1. A method of correcting the gradation of a composite image of a human subject image and a computer graphic image to be printed, comprising the steps of:
    making a gradation correction of image signals of a human subject image with a gradation correcting table data;
    making a gradation correction of image signals of a computer graphic image with a gradation correcting table data which is different from said gradation correcting data for said human subject image; and
    composing said image signals of said human subject image and computer graphic image as video signals at one of before and after said correction of gradation of said human subject image and computer graphic image.

2. A method as defined in claim 1, wherein said gradation correcting table data for said computer graphic image is a substantially linear table data.

3. A method as defined in claim 2, wherein said substantially linear table data has a gamma value of one (1).

4. A method as defined in claim 2, wherein said substantially linear table data has a gamma value of one (1) in a range where image signals are smaller and a gamma value larger than one (1) in a range where image signals are larger.

5. A method as defined in claim 2, wherein said gradation correction table data for said human subject image is a non-linear table data.

6. A method as defined in claim 2, wherein said gradation correction table data for said human subject image and said computer graphic image are selected among different table data provided according to different kinds of computer graphic images, different lighting conditions under which human subject images are directly taken by a TV camera and different kinds of recording materials carrying human subject images which are taken by said TV camera.

7. A method as defined in claim 2, further comprising steps of correcting the color balance of said human subject image and said computer graphic image with different color correction table data.

8. A method as defined in claim 7, further comprising a step of making a correction of gradation of said human subject image and said computer graphic image to be composed according to characteristics of a photographic processing system.

9. A method as defined in claim 2, wherein said color correction is executed by the use of the following color correction matrix formula:

$$\begin{bmatrix} R \\ G \\ B \end{bmatrix} = \begin{bmatrix} a1 & a2 & a3 \\ b1 & b2 & b3 \\ c1 & c2 & c3 \end{bmatrix} \begin{bmatrix} R_0 \\ G_0 \\ B_0 \end{bmatrix}$$

where
R, G, B: image signal for red, green, blue after color correction:
$R_O, G_O, B_O$: image signal for red, green, blue before color correction;
a1, a2, a3, b1, b2, b3, c1, c2, c3: are coefficients.

10. A method as defined in claim 9, wherein a set of coefficients of said color correction matrix formula is selected among a plurality of sets of coefficients provided for various conditions under which said human subject images are taken.

11. A method as defined in claim 9, wherein coefficients of said color correction matrix formula for computer graphic images are one (1) for diagonal terms and zero (0) for the remaining terms.

12. A method of correcting the color balance of a composite image of a human subject image and a computer graphic image, comprising the steps of:
    electrically composing a human subject image and a computer graphic image at one of before and after making a correction of color and gradation of said human subject image and said computer graphic image; and
    making a color correction of said human subject and computer graphic images by the use of the following color correction matrix formula with different coefficient matrices for said human subject and computer graphic images:

$$\begin{bmatrix} R \\ G \\ B \end{bmatrix} = \begin{bmatrix} a1 & a2 & a3 \\ b1 & b2 & b3 \\ c1 & c2 & c3 \end{bmatrix} \begin{bmatrix} R_0 \\ G_0 \\ B_0 \end{bmatrix}$$

where
R, G, B: image signal for red, green, blue after color correction
$R_O, G_O, B_O$: image signal for red, green, blue before color correction
a1, a2, a3, b1, b2, b3, c1, c2, c3: are coefficients.

13. A method as defined in claim 12, wherein a set of coefficients of said color correction matrix formula is selected so that different sets of coefficients are provided for various kinds of images.

14. A method as defined in claim 12, wherein coefficients of said color correction matrix formula for computer graphic images are one (1) for diagonal terms and zero (0) for the remaining terms.

* * * * *